(12) United States Patent
Ellmann et al.

(10) Patent No.: US 6,704,724 B1
(45) Date of Patent: Mar. 9, 2004

(54) PARALLEL OPTIMIZER HINTS WITH A DIRECT MANIPULATION USER INTERFACE

(75) Inventors: Curtis John Ellmann, Madison, WI (US); Olli Pekka Kostamaa, Santa Monica, CA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/461,130

(22) Filed: Dec. 14, 1999

(51) Int. Cl.$^7$ ............................................. G06F 17/30
(52) U.S. Cl. ..................... 707/4; 707/2; 707/5; 707/102
(58) Field of Search ............................... 707/2, 102, 4, 707/5; 345/763

(56) References Cited

U.S. PATENT DOCUMENTS

| | | | |
|---|---|---|---|
| 5,548,749 A | | 8/1996 | Kroenke et al. ............. 707/102 |
| 5,627,979 A | | 5/1997 | Chang et al. ................ 345/763 |
| 5,694,591 A | * | 12/1997 | Du et al. ........................ 707/2 |
| 5,745,746 A | * | 4/1998 | Jhingran et al. ................ 707/2 |
| 5,761,653 A | * | 6/1998 | Schiefer et al. ................ 707/2 |
| 5,857,180 A | * | 1/1999 | Hallmark et al. ............... 707/2 |
| 5,873,075 A | * | 2/1999 | Cochrane et al. .............. 707/2 |

OTHER PUBLICATIONS

Srivastava et al., "Optimizing Multi–Join Queries in Parallel Relationa Databases", IEEE, 1993, pp. 84–92.*

"Scattering and Gathering Data among Presentation Spaces", IBM technical Disclosure Bulletin, Mar. 1990, US, vol. 32, pp. 24–27.*

Alfonso F. Cardenas et al., "The Knowledge–Based Object Oriented PICQUERY+Language", IEEE Transactions on Knowledge and Data Engineering, vol. 5, No. 4, Aug. 1993, pp. 644–657.

Navin Kabra et al., "OPT++: An Object–Oriented Implementation for Extensible Database Query Optimization", The VLDB Journal, vol. 8, 1999, pp 55–78.

William O'Connell et al., "The Teradata SQL3 Multimedia Database Server", Book: Multimedia Technology for Applications, Editors: Sheu/Ismail, Publisher: IEEE Press 1998.

* cited by examiner

*Primary Examiner*—Thuy N. Pardo
(74) *Attorney, Agent, or Firm*—Gates & Cooper

(57) ABSTRACT

A method, apparatus, and article of manufacture for directly manipulating a query for a relational database management system (RDBMS). The query is transformed into an operator tree that is displayed on a monitor, wherein the operator tree includes nodes for data sources and operators referenced in the query, and lines between the nodes. The RDBMS alters an execution plan for the query in response to one or more manipulations made to the displayed operator tree by the user. Generally, these manipulations comprise hints for an optimizer function of the RDBMS that an efficient execution plan to be generated for the query. Specifically, the hints influence the optimizer to choose one execution plan over another when there is insufficient information for the optimizer function to make a choice on its own.

27 Claims, 6 Drawing Sheets

PARALLEL OPTIMIZER HINTS WITH A DIRECT MANIPULATION USER INTERFACE

BACKGROUND OF THE INVENTION

1. Field of the Invention

This invention relates in general to database management systems performed by computers, and in particular, to a parallel optimizer for a relational database management system that allows the input of hints with a direct manipulation interface.

2. Description of Related Art.

Relational DataBase Management Systems (RDBMS) using a Structured Query Language (SQL) interface are well known in the art. The SQL interface has evolved into a standard language for RDBMS software and has been adopted as such by both the American Nationals Standard Institute (ANSI) and the International Standards Organization (ISO).

The SQL interface allows users to formulate relational operations on one or more tables in the relational database, which in turn generate a result set that is a subset of data from the tables. While there have been various techniques developed for optimizing the performance of SQL statements, query optimization remains a difficult task.

Generally, an optimizer function within the RDBMS tries to find a query execution plan that will consume the least resources and run the fastest. Doing so requires information about the underlying tables in the relational database that might not necessarily be available.

To deal around the problem of insufficient information, an RDBMS typically provides the capability for the user to supply "hints" along with a query specification. These hints are usually specified as extra keywords or commands interspersed within the SQL statements using a "command-syntax" approach. These hints provide the optimizer function of the RDBMS with help in the form of extra information that can be used to generate the most efficient query execution plan.

Optimizer hints influence the query execution plan. In the simplest terms, the optimizer of the RDBMS takes the query, plus any hints supplied, and generates a query execution plan that is executed by the RDBMS. Hints can be used to influence the optimizer to choose one plan over another when there is insufficient information for it to make the choice on its own.

The problem with the command-syntax approach is that the user must specify the hints using commands and keywords that indirectly affect the plan generated by the optimizer function. The optimizer interprets the hints along with the other information it knows about to generate the final query execution plan. There is no opportunity to directly affect the plan that is produced, and so several iterations of supplying additional or different hints may be necessary before the optimizer correctly "guesses" what the user has in mind. This results in a development cycle that is more difficult and time consuming than is necessary.

While there have been various techniques developed for optimizing the performance of RDBMS, there is a need in the art for techniques that provide improved user interfaces for adjusting query execution plans.

SUMMARY OF THE INVENTION

The present invention discloses a method, apparatus, and article of manufacture for directly manipulating a query for a relational database management system (RDBMS). The query is transformed into an operator tree that is displayed on a monitor, wherein the operator tree includes nodes for data sources and operators referenced in the query, and lines between the nodes. The RDBMS alters an execution plan for the query in response to one or more manipulations made to the displayed operator tree by the user. Generally, these manipulations comprise hints for an optimizer function of the RDBMS, so that an efficient execution plan can be generated for the query. Specifically, the hints influence the optimizer to choose one execution plan over another when there is insufficient information for the optimizer function to make a choice on its own.

An object of the present invention is to optimize the database access on parallel processing computer systems. Another object of the present invention is to improve the performance of database partitions managed by a parallel processing computer systems.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The present invention, known as parallel optimizer hints with a direct manipulation user interface, allows a user to provide hints to an optimizer function a parallel processing database system. The advantages of the direct manipulation interface, as compared with traditional interfaces, include a method for specifying hints that mirror the query execution process directly, and give the user the ability to control the query execution directly.

ENVIRONMENT

Figure 1:
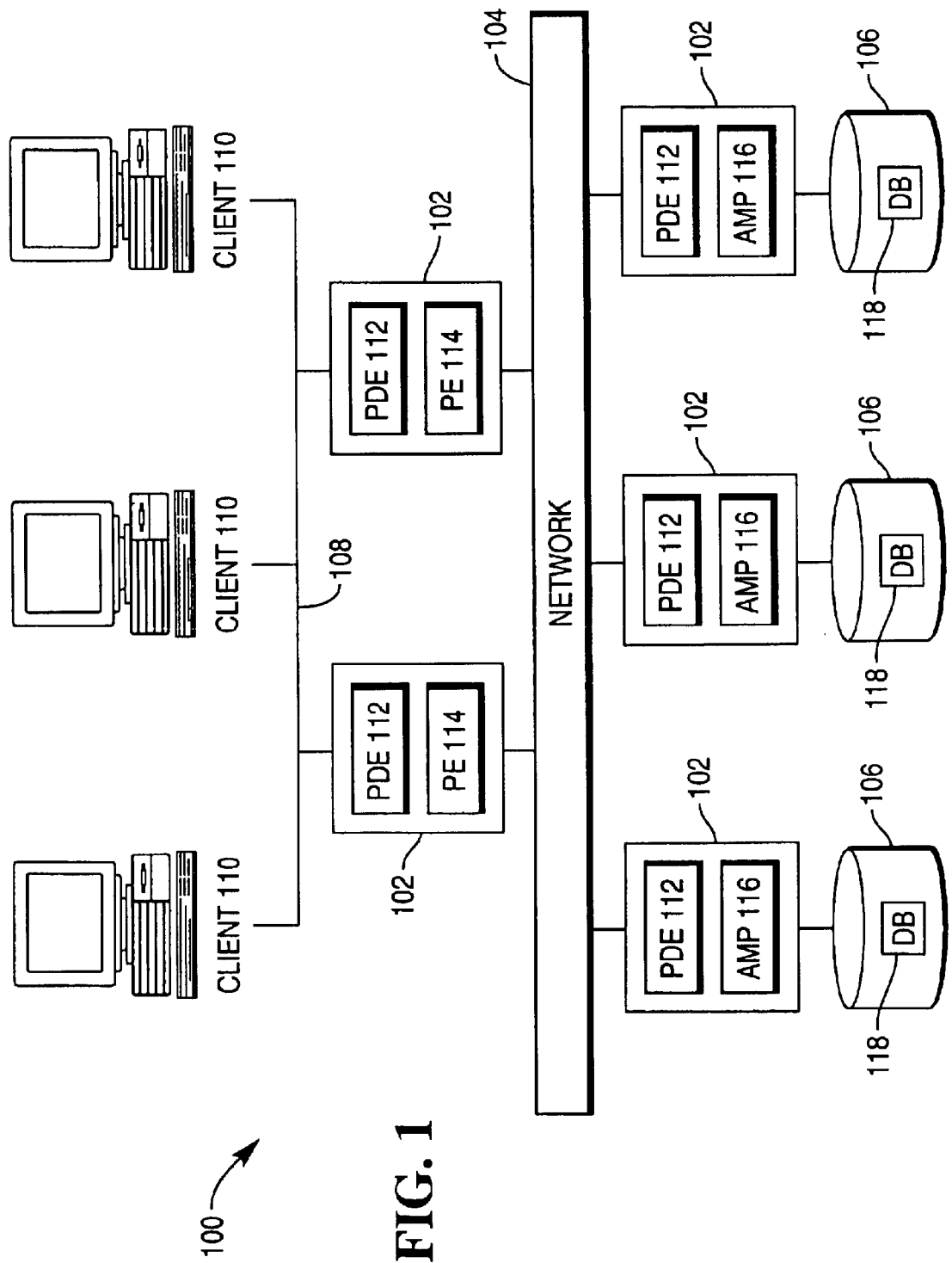
FIG. 1 illustrates an exemplary software and hardware environment that could be used with the present invention.

FIG. 1 illustrates an exemplary hardware and software environment that could be used with the present invention. In the exemplary environment, a computer system 100 is comprised of one or more processing units (PUs) 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a workstation 110, terminal, computer, or other input device to interact with the computer system 100. This interaction generally comprises queries that conform to the Structured Query Language (SQL) standard, and invoke functions performed by Relational DataBase Management System (RDBMS) software executed by the system 100.

In the preferred embodiment of the present invention, the RDBMS software comprises the Teradata® product offered by NCR Corporation, and includes one or more Parallel Database Extensions (PDEs) 112, Parsing Engines (PEs) 114, and Access Module Processors (AMPs) 116. These components of the RDBMS software perform the functions necessary to implement the RDBMS and SQL standards, i.e., definition, compilation, interpretation, optimization, database access control, database retrieval, and database update.

Work is divided among the PUs 102 in the system 100 by spreading the storage of a partitioned relational database 118 managed by the RDBMS software across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMP 116 managing the DSUs 106 that store the subset of rows.

The PEs 114 handle communications, session control, as well as generation, optimization and control of query execution plans. The PEs 114 fully parallelize all functions among the AMPs 116. As a result, the system of FIG. 1 applies a multiple instruction stream, multiple data stream (MIMD) concurrent processing architecture to implement a relational database management system 100.

Both the PEs 114 and AMPs 116 are known as "virtual processors" or "vprocs". The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when a PU 102 itself is comprised of a plurality of processors or nodes, the vproc concept provides for intra-node as well as the inter-node parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

The system 100 does face the issue of how to divide SQL statements or another unit of work into smaller sub-units, each of which can be assigned to an AMP 116. In the preferred embodiment, data partitioning and repartitioning may be performed, in order to enhance parallel processing across multiple AMPs 116. For example, the data may be hash partitioned, range partitioned, or not partitioned at all (i.e., locally processed). Hash partitioning is a partitioning scheme in which a predefined hash function and map is used to assign records to AMPs 116, wherein the hashing function generates a hash "bucket" number and the hash bucket numbers are mapped to AMPs 116. Range partitioning is a partitioning scheme in which each AMP 116 manages the records falling within a range of values, wherein the entire data set is divided into as many ranges as there are AMPs 116. No partitioning means that a single AMP 116 manages all of the records.

Generally, the PDEs 112, PEs 114, and AMPs 116 are tangibly embodied in and/or accessible from a device, media, carrier, or signal, such as RAM, ROM, one or more of the DSUs 106, and/or a remote system or device communicating with the computer system 100 via one or more of the DCUs 108. The PDEs 112, PEs 114, and AMPs 116 each comprise logic and/or data which, when executed, invoked, and/or interpreted by the PUs 102 of the computer system 100, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

OPERATION OF THE PREFERRED EMBODIMENT

Figure 2:
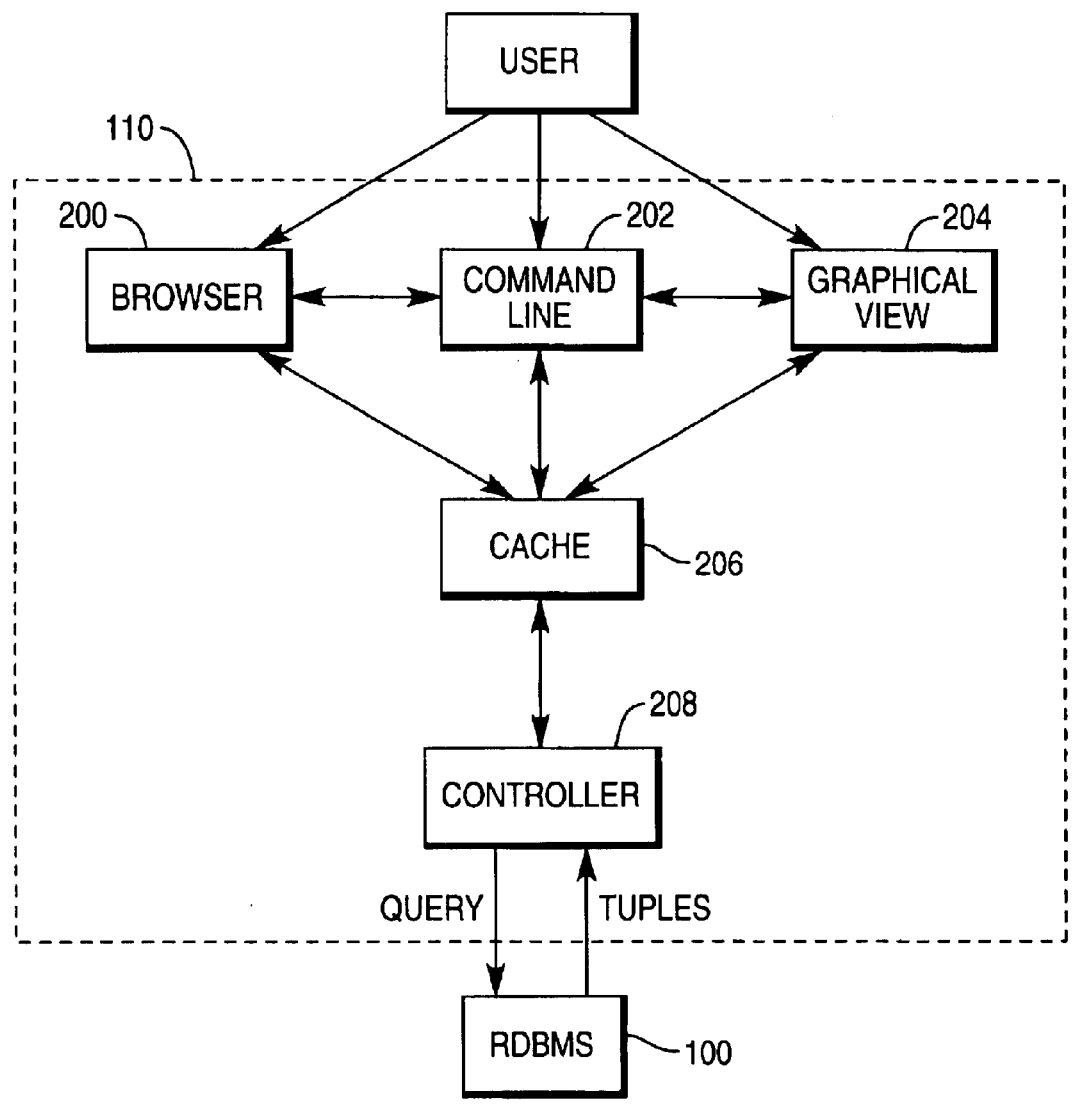
FIG. 2 illustrates an exemplary hardware and software environment for a client computer according to the preferred embodiment of the present invention.

FIG. 2 illustrates an exemplary hardware and software environment for the client computer 110 according to the preferred embodiment of the present invention. Specifically, the client computer 110 can include applications or graphical user interfaces (GUIs) that supports querying, browsing, and updating of database objects through either its graphical or textual user interfaces. After executing the query, the RDBMS transmits the results back to the client computer 110 in the form of a result set of tuples which can be iterated over using a cursor mechanism As shown in FIG. 2, the client computer 110 includes a browser 200, a command line query composer 202, a graphical view query composer 204, a cache 206, and controller 208. The browser 200 allows a user to view any table in the database 118. The command line query composer 202 allows the user to explicitly compose queries for the RDBMS using SQL syntax. The graphical view query composer 204 is responsible for creating, displaying and manipulating graphical representations of queries. The cache 206 stores user queries, catalog information, and results retrieved from the relational database 118. The controller 208 transmits the queries to the PE 114 for execution and directs the results transmitted from the PE 114 to the client computer 110 to be stored in cache 206.

As mentioned above, SQL statements or queries can be developed using a graphical representation in the graphical view query composer 204. In the preferred embodiment, queries can be graphically and logically represented as an operator tree. An operator tree is a tree in which each node represents a logical query algebra operator being applied to its inputs.

Figure 3:
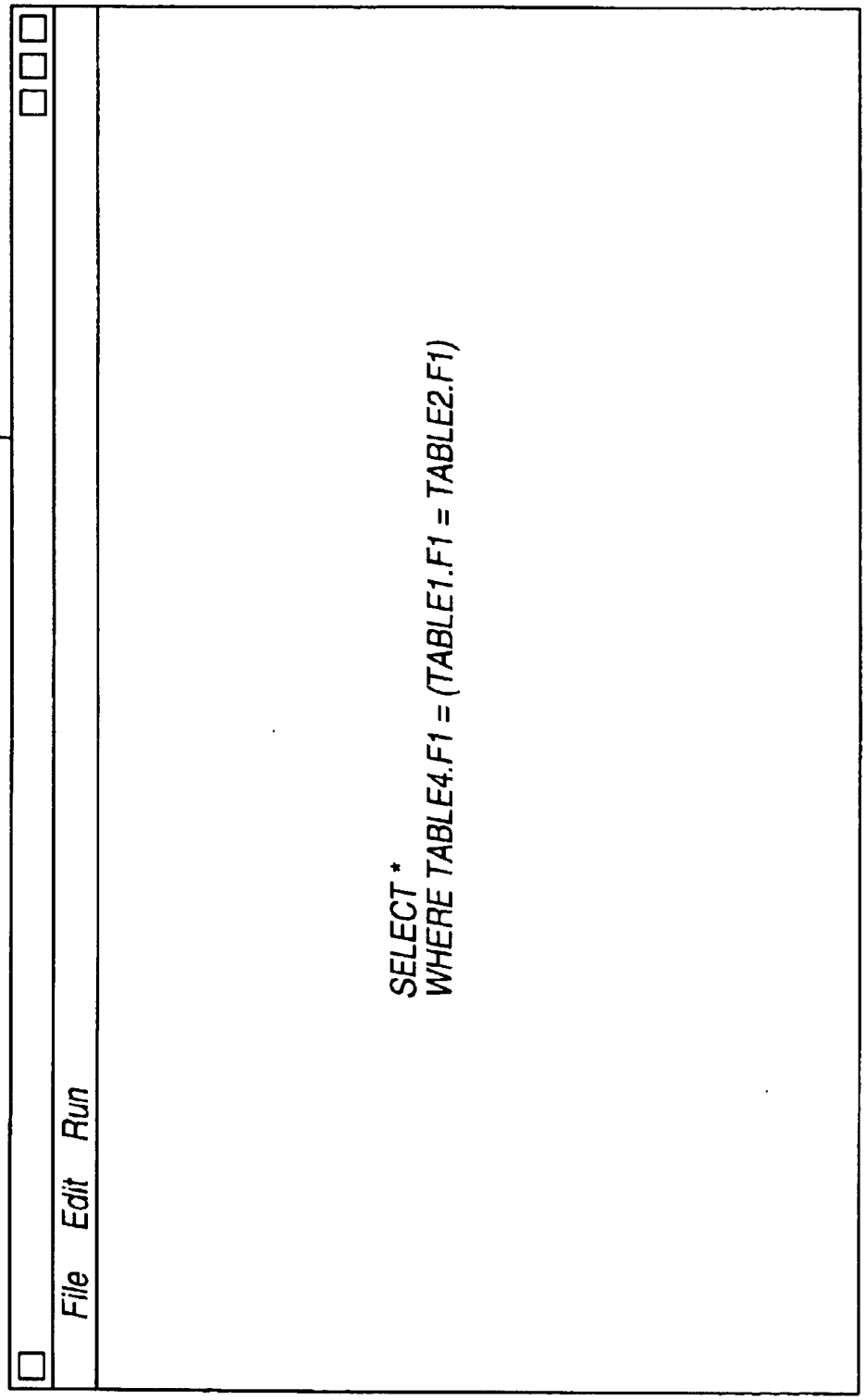
FIG. 3 illustrates an example SQL query according to the preferred embodiment of the present invention.

FIG. 3 presents an example SQL query. In general, each query can be rendered as a number of different operator trees, and each operator tree will be capable of generating a number of corresponding query execution plans.

During the query optimization process, the PE 114 must generate various operator trees that represent the input query (or parts of it), generate various query execution plans corresponding to each operator tree, and compute/estimate various properties of the operator trees and query execution plans (for example, cardinality of the output relation, estimated execution cost, etc.). From these various query execution plans, an optimal query execution plan is usually selected for execution by the PE 114.

Figure 4A:
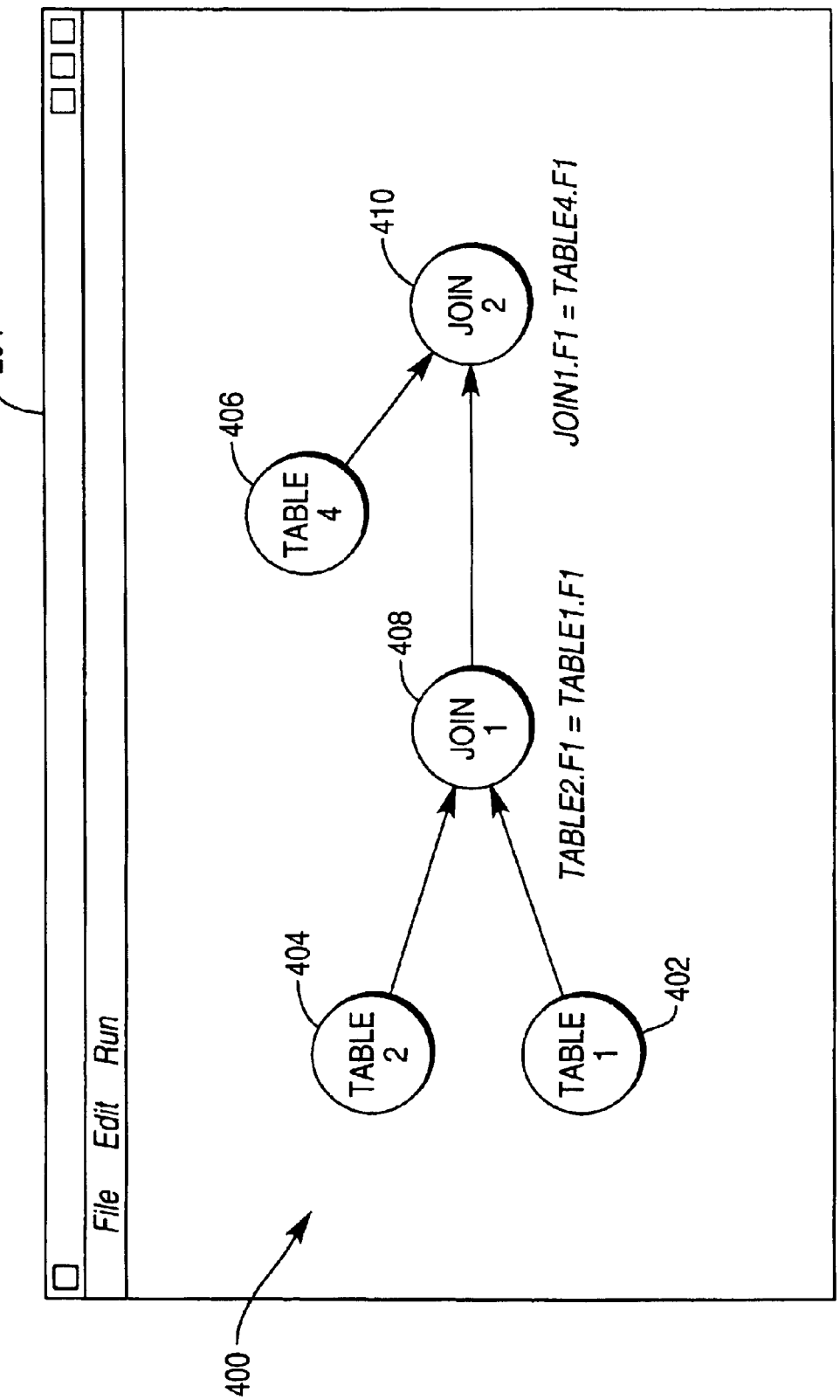
FIGS. 4A and 4B illustrate the use of a graphical view according to the preferred embodiment of the present invention.
Figure 4B:
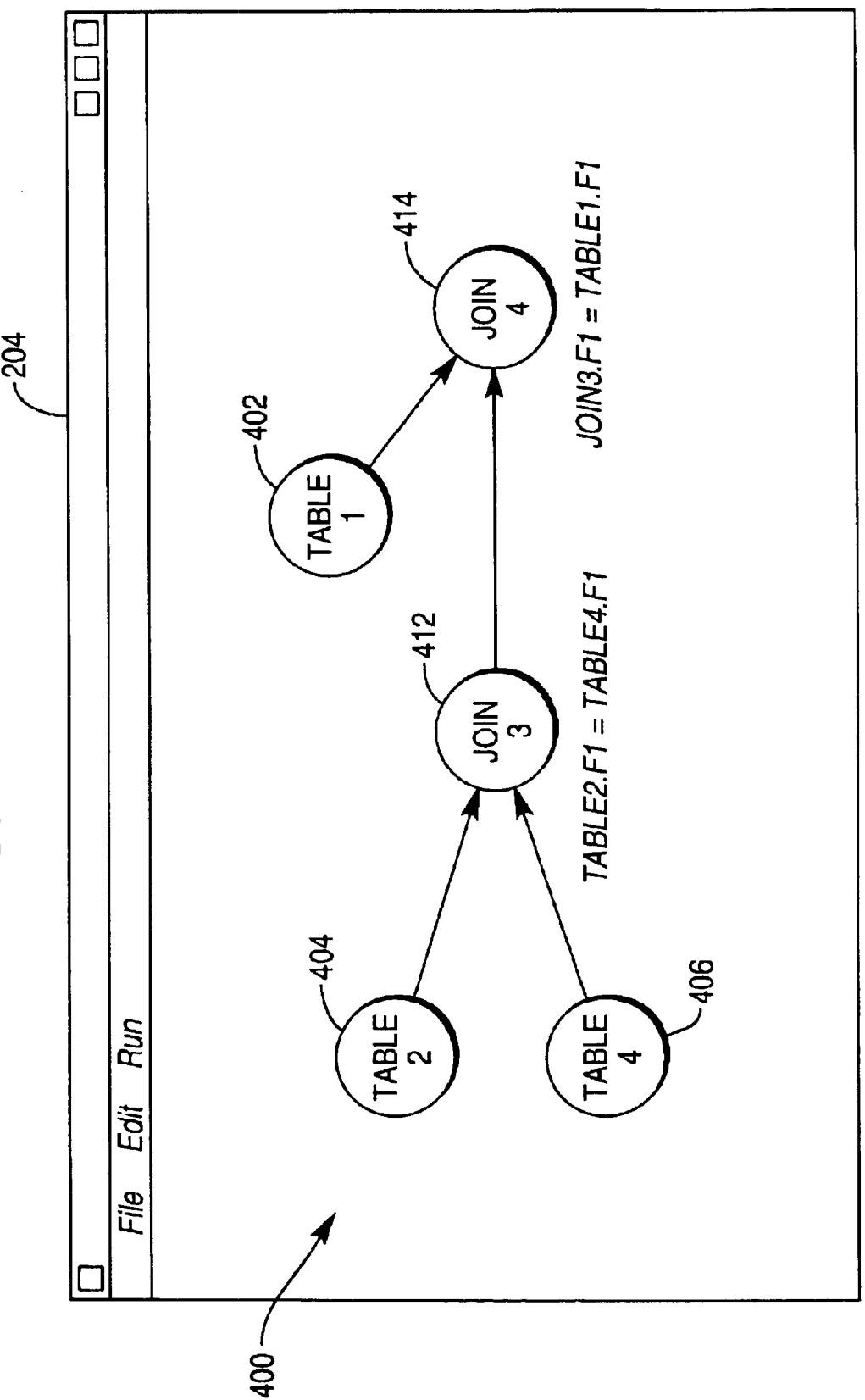

FIGS. 4A and 4B illustrate the use of the graphical view 204 according to the preferred embodiment of the present invention. The graphical view 204 provides a direct manipulation user interface for adjusting operator trees used to generate query execution plans. Rather than adding hints to the SQL statements that comprise the query, the user is instead presented with a graphical display of the operator tree in the graphical view 204. In the preferred embodiment, the operator tree includes symbols for operators and data sources, and lines connecting the operator symbols to the data source symbols.

In the example of FIG. 4A, the operator tree 400 resulting from the query of FIG. 3 is shown, wherein the operator tree includes nodes 402, 404, 406 for the tables TABLE1, TABLE2 and TABLE4, respectively, and nodes 408, 410 for the operators JOIN (#1) and JOIN (#2). This operator tree 400 is generated by the RDBMS itself for presentation to the user.

In the example of FIG. 4B, the operator tree 400 of FIG. 4A has been manipulated by the user to exchange the nodes 402, 406 for TABLE1 and TABLE4, respectively, and replacing the nodes 408, 410 for the operators JOIN (#1) and JOIN (#2) with new nodes 412, 414 for the operators JOIN (#3) and JOIN (#4). The user can edit the operator tree 400 by directly manipulating symbols in the diagram with the mouse. However, the user is prevented from changing the meaning of the query through a constraint checking mechanism that is built into the controller 210. The direct manipulation approach is useful because it provides an interface for specifying hints that mirror the query execution process directly, and give the user the ability to control the query execution plan directly.

LOGIC OF THE PREFERRED EMBODIMENT

Figure 5:
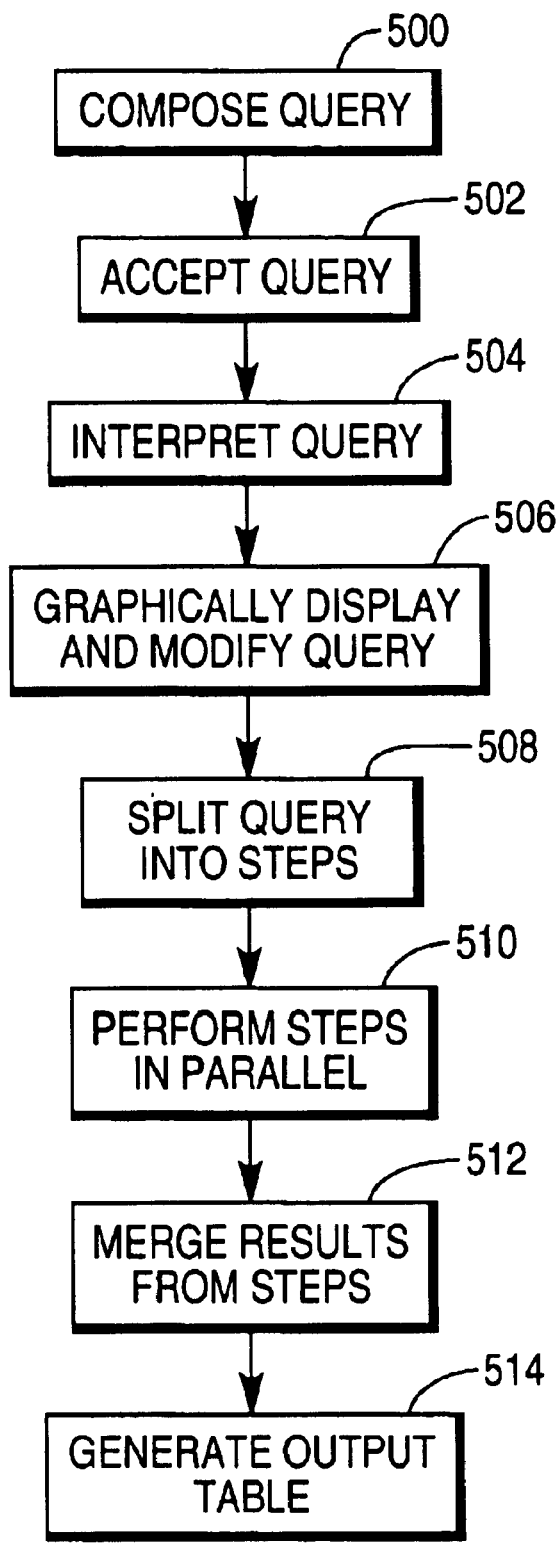
FIG. 5 is a flow chart illustrating the steps necessary for the interpretation and execution of SQL statements or other user interactions, either in a batch environment or in an interactive environment, according to the preferred embodiment of the present invention.

FIG. 5 is a flow chart illustrating the steps necessary for the interpretation and execution of SQL statements or other user interactions, either in a batch environment or in an interactive environment, according to the preferred embodiment of the present invention.

Block 500 represents the user composing, creating, or defining a query, either in the command line query composer 202 or the graphical view query composer 204, and the client computer 110 transmitting the query to the PE 114. The query includes a specification of one or more operations to be performed against one or more tables stored in the database 118 managed by the RDBMS.

Block 502 represents the SQL statements being accepted by the PE 114.

Block 504 represents the SQL statements being transformed by an interpreter function of the PE 114.

Block 506 represents the operator tree representation of the query being displayed in the graphical view query composer 204 so that the user can modify the query, and the client computer 110 transmitting the modified operator tree representation of the query to the PE 114. The operator tree includes nodes for data sources and operators referenced in the query, and lines between the nodes, and the user can alter the execution plan for the query by manipulating the operator tree. In the preferred embodiment, these manipulations performed by the operator are intended to comprise hints for an optimizer function of the PE 114, wherein the hints allow the optimizer function of the PE 114 to generate an efficient execution plan for the query, and specifically, the hints influence the optimizer to choose one execution plan over another when there is insufficient information for the optimizer function to make a choice on its own.

Block 508 represents the PE 114 splitting the modified operator tree representation of the query into one or more "step messages", wherein each step message is assigned to an AMP 116 that manages the desired records. As mentioned above, the rows of the tables in the database 118 are partitioned or otherwise distributed among multiple AMPs 116, so that multiple AMPs 116 can work at the same time on the data of a given table. If a request is for data in a single row, the PE 114 transmits the steps to the AMP 116 in which the data resides. If the request is for multiple rows, then the steps are forwarded to all participating AMPs 116. Since the tables in the database 118 may be partitioned or distributed across the DSUs 16 of the AMPs 116, the workload of performing the SQL statements can be balanced among AMPs 116 and DSUs 16.

Block 510 represents the AMPs 116 performing the required data manipulation associated with the step messages received from the PE 114, and then transmitting appropriate responses back to the PE 114.

Block 512 represents the PE 114 then merging the responses that come from the AMPs 116.

Block 514 represents the output or result table being generated by the PE 114 and then being transmitted back to the client computer 110 for display to the user.

CONCLUSION

This concludes the description of the preferred embodiment of the invention. The following paragraphs describe some alternative embodiments for accomplishing the same invention.

In one alternative embodiment, any type of computer, such as a mainframe, minicomputer, or personal computer, could be used to implement the present invention. In addition, any DBMS or other program that performs similar functions.

In yet another alternative embodiment, the steps or logic could be performed by more or fewer processors, rather than the designated and other processors as described above. For example, the steps could be performed simultaneously on a single processor using a multitasking operating environment.

In summary, the present invention discloses a method, apparatus, and article of manufacture for directly manipulating a query for a relational database management system (RDBMS). The query is transformed into an operator tree that is displayed on a monitor, wherein the operator tree includes nodes for data sources and operators referenced in the query, and lines between the nodes. The RDBMS alters an execution plan for the query in response to one or more manipulations made to the displayed operator tree by the user. Generally, these manipulations comprise hints for an optimizer function of the RDBMS, so that an efficient execution plan can be generated for the query. Specifically, the hints influence the optimizer to choose one execution plan over another when there is insufficient information for the optimizer function to make a choice on its own.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for directly manipulating a query in a computer system, comprising:
   (a) defining a query for a database management system executed by the computer system, wherein the query includes a specification of one or more operations to be performed against one or more tables stored in a database managed by the database management system;
   (b) displaying an operator tree for the query on a display device coupled to the computer system, wherein the operator tree includes nodes for data sources and operators referenced in the query, and lines between the nodes; and
   (c) altering an execution plan for the query in response to one or more manipulations made to the displayed operator tree for the query on the display device coupled to the computer system.

2. The method of claim 1, wherein the manipulations comprise hints for an optimizer function of the database management system.

3. The method of claim 2, wherein the hints allow the optimizer function of the database management system to generate an efficient execution plan for the query.

4. The method of claim 3, wherein the hints influence the optimizer function to choose one execution plan over another when there is insufficient information for the optimizer function to make a choice on its own.

5. The method of claim 1, further comprising defining the query using a graphical representation of the operator tree.

6. The method of claim 1, wherein each query can be rendered as a number of different operator trees.

7. The method of claim 1, wherein each operator tree can be used to generate a plurality of execution plans.

8. The method of claim 1, further comprising editing the operator tree by directly manipulating the nodes and lines.

9. The method of claim 1, wherein one or more of the tables are partitioned across a plurality of processing units of the computer system and each of the processing units manages at least one partition of the table.

10. An apparatus for directly manipulating a query in a computer system, comprising
   (a) a computer system;
   (b) logic, performed by the computer system, for:
      (1) defining a query for a database management system executed by the computer system, wherein the query includes a specification of one or more operations to be performed against one or more tables stored in a database managed by the database management system,
      (2) displaying an operator tree for the query on a display device coupled to the computer system, wherein the operator tree includes nodes for data sources and operators referenced in the query, and lines between the nodes; and
      (3) altering an execution plan for the query in response to one or more manipulations made to the displayed operator tree for the query on the display device coupled to the computer system.

11. The apparatus of claim 10, wherein the manipulations comprise hints for an optimizer function of the database management system.

12. The apparatus of claim 11, wherein the hints allow the optimizer function of the database management system to generate an efficient execution plan for the query.

13. The apparatus of claim 12, wherein the hints influence the optimizer function to choose one execution plan over another when there is insufficient information for the optimizer function to make a choice on its own.

14. The apparatus of claim 10, further comprising logic for defining the query using a graphical representation of the operator tree.

15. The apparatus of claim 10, wherein each query can be rendered as a number of different operator trees.

16. The apparatus of claim 10, wherein each operator tree can be used to generate a plurality of execution plans.

17. The apparatus of claim 10, further comprising logic for editing the operator tree by directly manipulating the nodes and lines.

18. The apparatus of claim 10, wherein one or more of the tables are partitioned across a plurality of processing units of the computer system, and each of the processing units manages at least one partition of the table.

19. An article of manufacture embodying logic for directly manipulating a query in a computer system, the logic comprising:
   (a) defining a query for a database management system executed by the computer system, wherein the query includes a specification of one or more operations to be performed against one or more tables stored in a database managed by the database management system;
   (b) displaying an operator tree for the query on a display device coupled to the computer system, wherein the operator tree includes nodes for data sources and operators referenced in the query, and lines between the nodes; and
   (c) altering an execution plan for the query in response to one or more manipulations made to the displayed operator tree for the query on the display device coupled to the computer system.

20. The method of claim 19, wherein the manipulations comprise hints for an optimizer function of the database management system.

21. The method of claim 20, wherein the hints allow the optimizer function of the database management system to generate an efficient execution plan for the query.

22. The method of claim 21, wherein the hints influence the optimizer function to choose one execution plan over another when there is insufficient information for the optimizer function to make a choice on its own.

23. The method of claim 19, further comprising defining the query using a graphical representation of the operator tree.

24. The method of claim 19, wherein each query can be rendered as a number of different operator trees.

25. The method of claim 19, wherein each operator tree can be used to generate a plurality of execution plans.

26. The method of claim 19, further comprising editing the operator tree by directly manipulating the nodes and lines.

27. The method of claim 19, wherein one or more of the tables are partitioned across a plurality of processing units of the computer system, and each of the processing units manages at least one partition of the table.

* * * * *